United States Patent [19]

Bussi

[11] Patent Number: 5,117,720
[45] Date of Patent: Jun. 2, 1992

[54] APPARATUS FOR LOCATING UTILITY STRUCTURES BEHIND CONSTRUCTION PANELS

[76] Inventor: Aldo A. Bussi, 372 Taylor Ave., Plainedge, N.Y. 11756

[21] Appl. No.: 634,414

[22] Filed: Dec. 27, 1990

Related U.S. Application Data

[63] Continuation-in-part of Ser. No. 537,338, Jun. 13, 1990.

[51] Int. Cl.$^5$ .............................................. B26F 1/00
[52] U.S. Cl. ..................................... 83/660; 30/366
[58] Field of Search ..................... 83/30, 660; 30/360, 30/366; 33/DIG. 10

[56] References Cited

U.S. PATENT DOCUMENTS

| | | | |
|---|---|---|---|
| 241,413 | 9/1876 | Drake . | |
| 321,389 | 6/1885 | Schirmer . | |
| 346,148 | 7/1886 | Durham . | |
| 736,121 | 8/1903 | Lipscomb . | |
| 2,775,812 | 1/1957 | Mohr . | |
| 2,788,151 | 4/1957 | Shore . | |
| 2,898,688 | 8/1959 | Cottar . | |
| 3,015,408 | 1/1962 | Campbell et al. | 220/3.4 |
| 3,733,707 | 5/1973 | Nix | 33/180 R |
| 3,884,280 | 5/1975 | Chailer | 144/73 |
| 4,059,905 | 11/1977 | Wieting | 33/180 R |
| 4,087,913 | 5/1978 | Jackson | 30/360 |
| 4,096,964 | 6/1978 | Glick | 220/3.4 |
| 4,202,388 | 5/1990 | Wieting | 144/323 |
| 4,209,103 | 6/1980 | Glovier | 220/3.4 |
| 4,335,511 | 6/1982 | Bowling | 30/366 |
| 4,339,973 | 7/1982 | Lawrence | 83/30 |
| 4,359,302 | 11/1982 | Payne | 409/84 |
| 4,605,139 | 8/1986 | Dacar | 220/3.4 |
| 4,779,393 | 10/1988 | Jong | 52/585 |
| 4,802,284 | 2/1989 | Jackson | 33/528 |

FOREIGN PATENT DOCUMENTS

2710397 9/1978 Fed. Rep. of Germany .

Primary Examiner—Mark Rosenbaum
Assistant Examiner—John M. Husar
Attorney, Agent, or Firm—Hopgood, Calimafde, Kalil, Blaustein & Judlowe

[57] ABSTRACT

The present invention concerns apparatus for locating utility structures behind construction panels. In the preferred embodiment, the apparatus is realized in the form of a locator element comprising a body portion, an attachment portion, a puncture portion, and an engaging portion having a knurled or textured surface. The body portion has a longitudinal extent with first and second end portions. The attachment portion is provided to the first end portion for attaching to the utility structure, whereas the puncture portion provides to the second end portion for puncturing through the construction panel. The engaging portion on the other hand, is provided for engaging with a tool for removably detaching the locator element from the utility structure. According to the method of the present invention, location of the utility structure is determined using the exposed portion of the locator element which protrudes beyond the construction panel when the construction panel is positioned over the utility structure and in the predetermined mounting position. Thereafter, prior to formation of the access-opening, the locator element is removably detached from the utility structure using the tool. The present invention also provides a hand-holdable tool which has a housing that serves as a utility box template, provides a storage compartment for storing a plurality of locator elements, and further provides one or more gripping sockets for installing and removing locator elements from utility structures.

20 Claims, 6 Drawing Sheets

APPARATUS FOR LOCATING UTILITY STRUCTURES BEHIND CONSTRUCTION PANELS

This is a Continuation-In-Part Application of application Ser. No. 07/537,338, Filed on Jun. 13, 1990

BACKGROUND OF THE INVENTION

1 Field of Invention

The present invention relates to apparatus for locating the exact position of apertures to be formed in construction panels so that utility structures, such as electrical outlet boxes, cable service boxes, plumbing fixtures, and window frames disposed behind the construction panels, can be accessed through the apertures when the construction panels are installed.

2. Brief Description of Prior Art

A variety of devices are known for locating the exact position of electrical utility boxes disposed behind a construction panel. In this regard, the purpose of determining the location of the utility box is to identify where, relative to the utility box, an access-opening is to be formed in the construction panel. In this manner, when the construction panel is positioned and installed over the utility box, access thereto is provided through the access-opening in the construction panel. In the case of an electrical utility box, a precisely-defined access opening permits installation of an electrical switch or outlet after the construction panel has been installed. In the case of a multiple service outlet, the access opening permits installation of computer and TV cables, telephone jacks and the like in a functionally similar manner.

In connection with such a general method, a variety of prior art devices for locating utility box apertures can be found, for example, in U.S. Pat. Nos. 2,775,812 to Mohr; 4,802,284 to Jackson; 2,788,151 to Shore; 2,898,688 to Cottar; 3,015,408 to Campbell, et al.; 3,260,400 to Miles; 4,059,905 to Wieting; 3,733,707 to Nix; 4,096,964 to Glick; 4,202,388 to Wieting; 4,209,103 to Glovier; 4,335,511 to Bowling; 4,209,103 to Glovier; 4,339,973 to Lawrence; 4,359,302 to Payne; and 4,605,139 to Dacar. While each of these prior art devices permits location of apertures to be formed in construction panels, all of these prior art locator devices suffer from several significant shortcomings and drawbacks.

In particular, prior art locator devices require that the located aperture first be removed from the construction panel prior to removing the locator device from the outlet box. Consequently, with the locator device attached to the utility box, it is significantly more difficult to cut the outlined aperture in the construction panel. This increased difficulty translates into more time and effort to the overall operation, causing a reduction in worker productivity.

Also, with prior art locator devices remaining in place through the construction panel during the aperture formation operation, there is increased risk of the cutting tool, such as a jigsaw, striking the locator device. This increased risk can cause several problems: (i) inadvertently cutting of an undesired portion of the construction panel and/or (ii) injuring the cutting tool operator.

In addition to the above shortcomings and drawbacks, prior art locating devices also are incapable of locating apertures in construction panels, for accessing studded window or door frames.

Thus, there is a clear need in the construction art for apparatus for locating utility boxes and studded window and door frames, without the accompanying shortcomings and drawbacks of the prior art methods and apparatus.

Accordingly, it is a primary object of the present invention to provide apparatus for locating the exact position of utility structures behind construction panels, and which overcomes the shortcomings and drawbacks of the prior art.

It is a further object to the present invention to provide such a locator device which can be easily removed from behind the construction panel, prior to cutting out the access aperture in the construction panel for the utility structure.

It is a further object of the present invention to provide such a locator device in the form of a pin-like locator element which can be screwed into either the threaded holes of a standard electrical outlet box, wood wall studs or sheet metal using a conventional nut-driver tool, open-end wrench or pliers and which can also be easily removed from the utility structure using the same tool, prior to removing the cut out access aperture.

A further object of the present invention is to provide a hand-holdable tool which functions as a case for storing a plurality of the locator elements, and which also can be utilized as a tool for providing an outlet box template pattern and a means for screwing and unscrewing locator elements of the present invention.

These and other objects of the present invention will become apparent and hereinafter described in the detailed description and the claims.

SUMMARY OF THE INVENTION

According to one aspect of the present invention, apparatus is provided for locating a utility structure disposed behind a construction panel to be mounted thereover.

In general, the apparatus is in the form of a locator element having attachment means at one end thereof for attaching to a utility structure, and puncture means at the other end thereof for puncturing through the construction panel. The locator element further includes the engaging means for engagement with a tool for removably disattaching the locator element from the utility structure. At least one locator element is attached to the utility structure to be located, and then the construction panel is positioned over the utility structure and disposed in a predetermined mounting position. Sufficient force is then applied to the construction panel so that the puncture means punctures or pierces through the construction panel and protrudes therebeyond to expose at least a portion of the engaging means for engagement with the tool. The location of the utility structure is then determined using the protruding portion of the locator element, and for example, a template matched to the outer front dimensions of the utility structure. Thereafter, with the construction panel positioned over the utility structure while disposed in the predetermined mounting position, the locator element is removably detached from the utility structure by engaging the tool with the exposed portion of the engaging means.

In the preferred embodiment of the present invention, determination of the location of the utility structure is achieved by outlining on the construction board, the general boundaries of the utility structure relative to the locator element. Thereafter, this outlined portion of construction board is removed to provide an access opening to the utility structure.

In one embodiment, the body portion has a circular cross-section disposed between the ends of the locator element, and engaging means comprising knurling on a portion of the circularly cross-sectioned body portion which protrudes beyond the construction panel. Also, the detachment means comprises screw threads for screwing into the utility structure. A conventional tool such as channel-locks or pliers having a gripping portion, can be used to engage the protruding knurled body portion of the locator element. The length of the body portion should be such that when the puncture means protrudes through the construction panel, the gripping portion of the tool can be engaged therewith and used to remove the locator element from the utility structure prior to cutting out the access opening in the construction panel.

Yet in a further embodiment of the present invention, the locator element can be used to simultaneously locate the position of a utility structure disposed behind both an underlying construction panel and an overlying finishing panel.

According to another aspect of the present invention, a hand-holdable tool is provided for storing a plurality of locator elements of the present invention. The tool is adapted to provide an outlet box template pattern, a storage compartment for locator elements, and a means for screwing and unscrewing locator elements of the present invention.

As a result of the present invention, it is now possible to efficiently locate the position of utility structures behind construction panels using the novel locator element of the present invention. At the same time, it is also possible to simply remove the locator element from the utility structure prior to cutting the located access opening in the construction panel. Consequently, the present invention provides a significant contribution to the construction art in particular, and to the locating art in general.

BRIEF DESCRIPTION OF THE DRAWINGS

For a further understanding of the objects of the present invention, reference is made to the following detailed description of the preferred embodiments which are to be taken in connection with the accompanying drawings, wherein.

DETAILED DESCRIPTION OF THE PREFERRED EMBODIMENTS

Figure 1A:
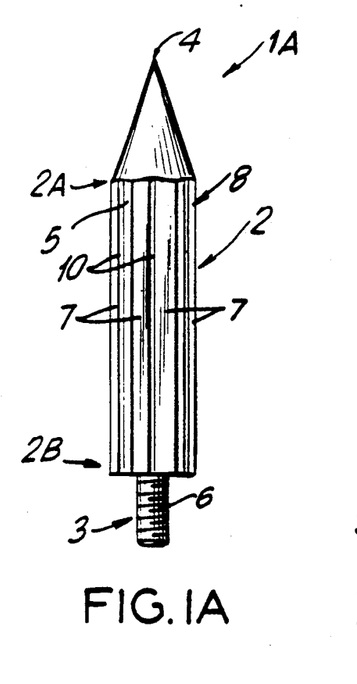
FIG. 1A is an elevated side view of a first embodiment of the locator element of the present invention.
Figure 1B:
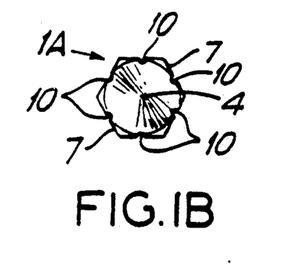
FIG. 1B is a top plan view of the first embodiment of the locator element of the present invention.
Figure 1C:
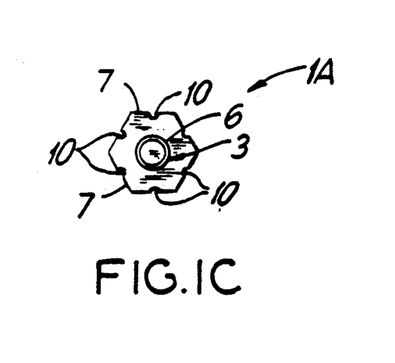
FIG. 1C is a bottom plan view of the first locator element of the present invention.

In FIGS. 1A, 1B and 1C, one embodiment of the apparatus of the present invention is shown in the form of a pin-like locator element 1A. In general, the locator element 1A comprises a body or shank portion 2, attachment means 3, puncture means 4, and engaging means 5. The body portion 2 has cylindrical geometry, and thus a longitudinal extent as shown. The body portion 2 also has a first end 2A and a second end 2B, to which the puncture means 4 and the attachment means 3 are provided, respectively.

As shown in FIGS. 1A, 1B and 1C, attachment means 3 on second end 2B is realized as a screw structure 3 having machine threads 6 which match the thread size of the thread holes provided in a standard U.L. approved electrical outlet box. Puncture means 4 on first end 2A is realized preferably as a sharp, piercing structure of generally conical geometry. Body portion 2, as shown, comprises a hexagonally cross-sectioned shank of constant cross-sectional dimensions along its length which extends from screw structure 3 towards the conical puncture means 4. The cross-sectional dimension of the shank may be realized as any other polygonal form, such as a square or any polygon.

In the illustrated embodiment, each face 7 of shank 2 has a longitudinally extending groove 10 which facilitates cutting and penetration of the shank through the construction panel. While these grooves are not essential to the present invention, they are believed to facilitate penetration of shank 2 through the construction panel. As shown, engaging means 5 is realized as a portion 8 of the hexagonally cross-sectioned shank 2. Notably, the length of this shank portion 8 is such that it protrudes beyond a construction panel (such as sheet rock) when the panel is positioned over a utility structure and puncture means 4 protrudes through the construction panel. The hexagonally-dimensioned inner bearing surface of the socket head of a conventional nut driver can be inserted over conical puncture means 4 and releasably engaged with engaging means 5 (i.e., portion 8 of the shank), for screwing locator element 1A into and out of the threaded holes 32 of the utility structure 30, shown in FIGS. 9A and 9B.

Figure 2:
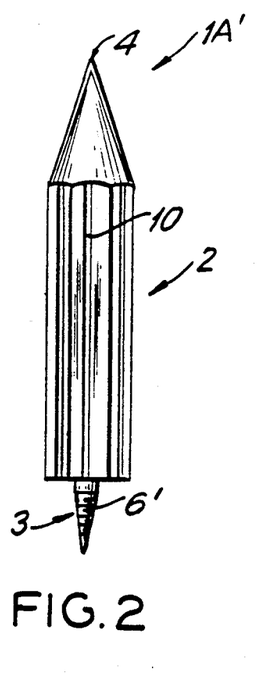
FIG. 2 is an elevated side view of a second embodiment of the locator element of the present invention.
Figure 3:
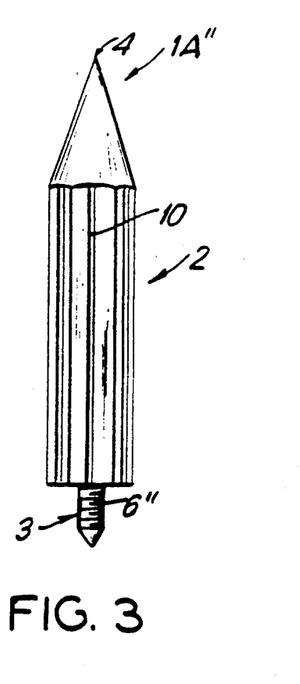
FIG. 3 is an elevated side view of a third embodiment of the locator element of the present invention.

In FIGS. 2 and 3, two other embodiments of the locator element of the present invention are shown, referenced by 1A' and 1A", respectively. In FIG. 2, attachment means 3 of locator element 1A' is realized as a screw structure provided with screw threads 6' for self-tapping into wood utility structures. In FIG. 3, attachment means 3 is realized as a screw structure provided with screw threads 6" for self-tapping into metallic and like utility structures. The size of these various screw threads will differ from application to application, as discussed hereinabove.

In FIGS. 4A, 4B, 5 and 6, three other embodiments of the locator element of the present invention are shown, referenced by 1B, 1B' and 1B", respectively. In each of these three alternative embodiments, body portion 2 has a cylindrical geometry, and puncture means 4 is realized as a conical puncture means, as in the first, second and third embodiments. Engaging means 5, on the other hand, is realized by a knurled or textured surface 12, formed about distal end 2A of the body portion of each locator element. As will be discussed in greater detail hereinafter, textured surface 12 facilitates engagement of distal end 2A of locator elements 1B, 1B' and 1B", with the gripping portion of a tool, when the locator element is being installed into and removed from the utility structure while penetrating through wallboard material.

Figure 4A:
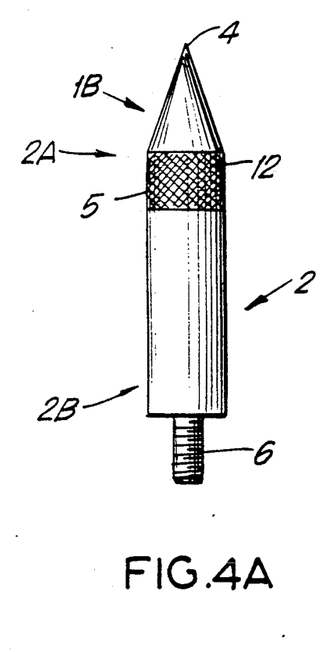
FIG. 4A is an elevated side view of a fourth embodiment of the locator element of the present invention.
Figure 4B:
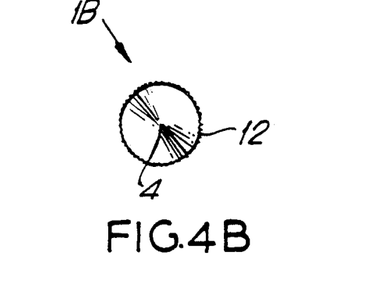
FIG. 4B is a top plan view of the fourth embodiment of the locator element of the present invention.
Figures 5, 6:
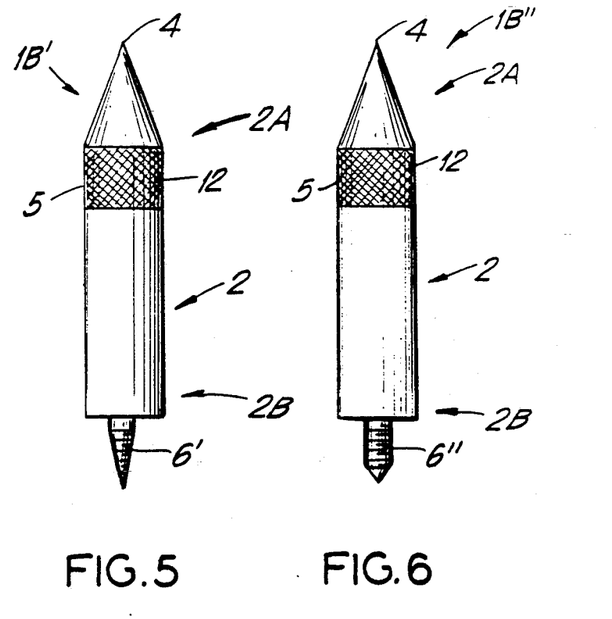
FIG. 5 is a fifth embodiment of the locator element of the present invention.
FIG. 6 is a sixth embodiment of the locator element of the present invention.

In each of the three alternative embodiments, a different type of attachment means 3 is employed. As illustrated in FIGS. 4A and 4B, the attachment means of locator element 1B is realized as machine threads 6 which match the thread size of the thread holes provided in a standard U.C. approved electrical outlet box. In FIG. 5, the attachment means of locator element 1B' is realized as a screw structure provided with screw threads 6' for self-tapping into wood utility structures. The attachment means, shown in FIG. 6, on the other hand, is realized as a screw structure provided with screw threads 6" for self-tapping into metallic and like utility structures.

Figure 7A:
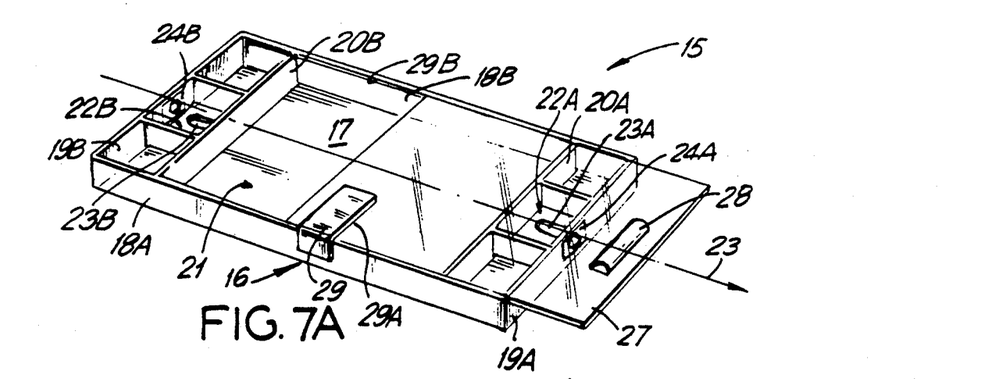
FIG. 7A is a perspective view of the hand-holdable tool of the present invention, showing the storage compartment with its sliding cover partially open.
Figure 7B:
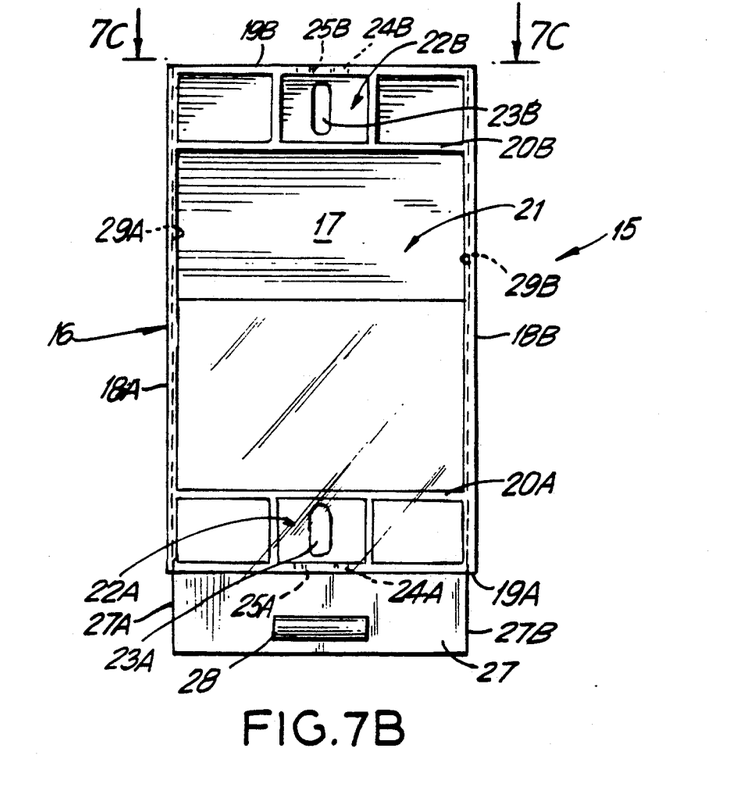
FIG. 7B is a plan view of the hand-holdable tool of the present invention shown in FIG. 7A.
Figure 7C:
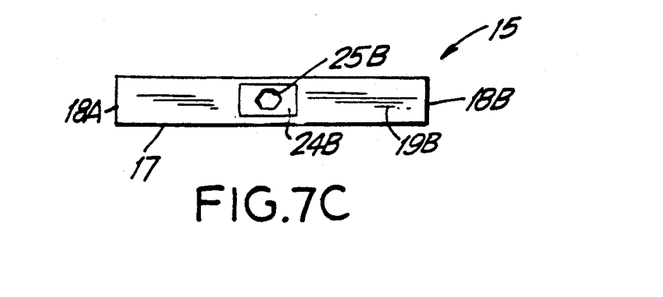
FIG. 7C is an elevated end view taken along line 7C—7C of FIG. 7B, showing the gripping means feature of the hand-holdable tool of the present invention.

Referring to FIGS. 7A, 7B and 7C, there is shown a hand-holdable tool 15 for use with the locator pins described above. In general, tool 15 comprises a handheld housing 16, which is provided with a rectangular bottom (i.e., base) panel 17 that provides a template pattern which generally corresponds to the outer dimensions of a conventional utility box. Projecting orthogonally from bottom panel 17 are spaced apart side walls 18A and 18B, and end walls 19A and 19B which join with ends of the side walls to form a three-dimensional body portion. As shown in the illustrated embodiment, the body portion housing 16 is a rectangular shaped structure and a longitudinal extent that is generally shaped to fit within the palm of ones hand. In alternative embodiments, the geometry of the housing body portion can vary in order to satisfy other functional or aesthetic considerations.

Inner end walls 20A and 20B are disposed between side walls 18A and 18B, at a predetermined distance away from respective end walls, 19A and 19B, as shown. Between inner end walls 20A and 20B and side walls 18A and 18B, a storage compartment 21 for locator elements is formed having a central opening. Preferably, one or more snap-fit type retaining clips are provided within storage compartment 21 for holding locator elements in place. Between respective inner and outer end walls 19A, 20A and 20A, 20B and side walls 18A and 18B, a pair of end zones 22A and 22B are formed on opposite ends of the storage compartment. Along the longitudinal axis 23 of housing 16, elongated apertures 23A and 23B are formed through bottom panel 16 between the inner and outer end walls of each respective end zone.

As illustrated in greater detail in FIGS. 7B and 7C, a pair of gripping means 24A, 24B is formed in each opposing end wall 19A and 19B, as shown. In the illustrated embodiment, each gripping means 24A, 24B is realized as a square-shaped nut. As shown in FIGS. 7B and 7C, each nut has a hexagonal shaped socket or bore 25A, 25B having internal dimensions which, in the illustrated embodiment, are adapted to receive the hexagonally cross-sectioned engaging means 5 of the locator elements shown in FIGS. 1A through 3. So disposed, each gripping means 24A and 24B is accessible through its respective end wall panel. Nuts 24A and 24B can be securely molded in end walls 19A and 19B, respectively, during the manufacture of tool 15.

In order to retain the locator pins in storage compartment 21, a transparent slidable cover panel 27 is provided, as shown in FIG. 7A. Cover panel 27 is provided with grip 28 and has edges 27A and 27B which are adapted to slide within grooves 29A and 29B formed on the inside of side panels 18A and 18B, respectively. Also, in order to releasably attach tool 15 to apparel, such as a belt or a pocket, a clip 29 is provided to the housing so that a narrow gap 29A is formed between clip 29 and cover panel 27, between which the belt or pocket can be clipped. In the illustrated embodiment, clip 29 is secured to side wall 18A. However, this location may vary from embodiment to embodiment.

Figure 8:
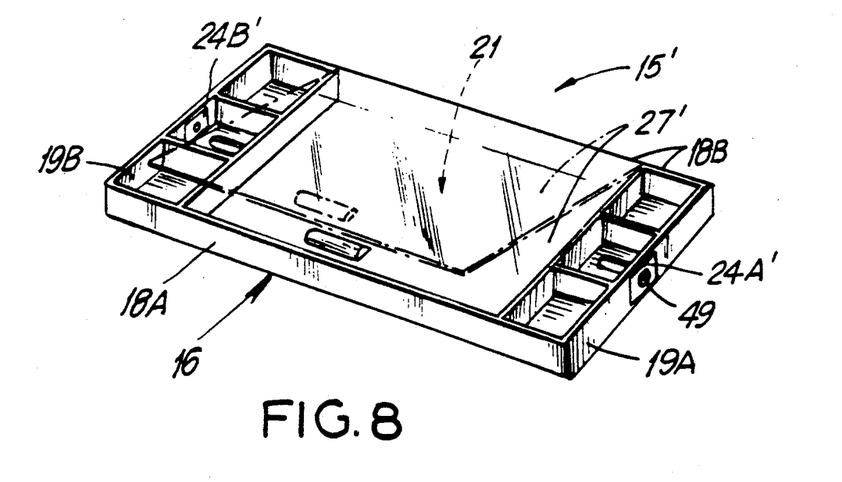
FIG. 8 is a perspective view of an alternative embodiment of the hand-holdable tool of the present invention, showing the storage compartment thereof with its hinged cover panel partially open.
Figure 8A:
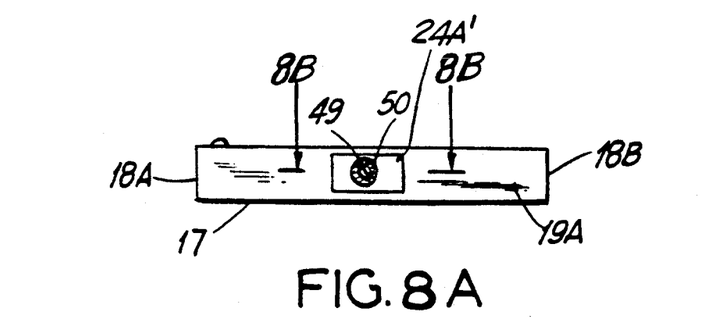
FIG. 8A is an elevated end view of the hand holdable tool of FIG. 8, showing an alternative embodiment of the gripping means thereof.
Figure 8B:
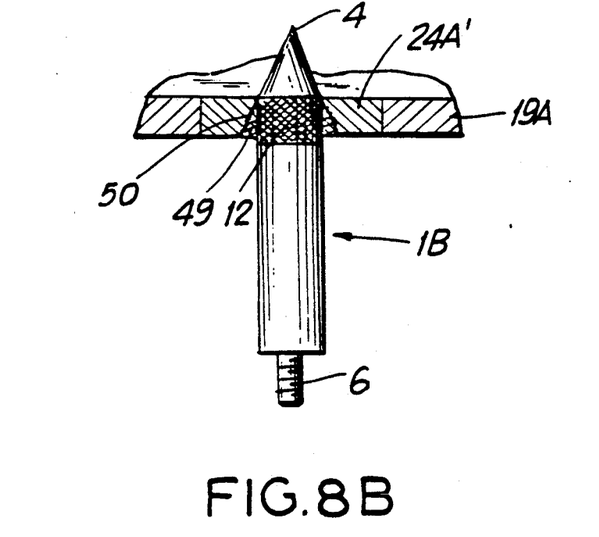
FIG. 8B is a partially broken away view of the tool hereof taken along line 8B—8B of FIG. 8A, showing a locator element engaged within the tapered bore of the gripping means.

In an alternative embodiment of tool 15' shown in FIG. 8, cover panel 27' is hingedly connected to side panel 18B and is adapted to close shut in a snap-fit manner. As illustrated in FIG. 9B, in this configuration, cover panel 27' can be opened and closed over storage compartment 21, while housing 16 is disposed over a pair of locator elements projecting through apertures 23A and 23B during location of a utility box. In the illustrated embodiment, each gripping means 24A', 24B' is formed in each opposing end wall, as shown. Each gripping means 24A', 24B' is realized as a square-shaped nut which is securely embedded within respective end wall 19A, 19B. As shown in FIGS. 8A and 8B, each nut has a tapered bore 49 having knurled or textured wall surfaces 50 which are adapted to engage with knurled surface 12 of locator elements 1B', or 1B" when puncture means 4 thereof extends beyond tapered bore 49. In other embodiments, each gripping means can be realized as a device which slips over the puncture means and releasably engages knurled surfaces 12 of the locator elements disclosed in FIGS. 4A through 6.

Preferably, tools 15 and 15' are made from a high-impact plastic material using, for example, injection molding technology. However, the present invention contemplates making the tools hereof from metal and like materials.

Figure 9A:
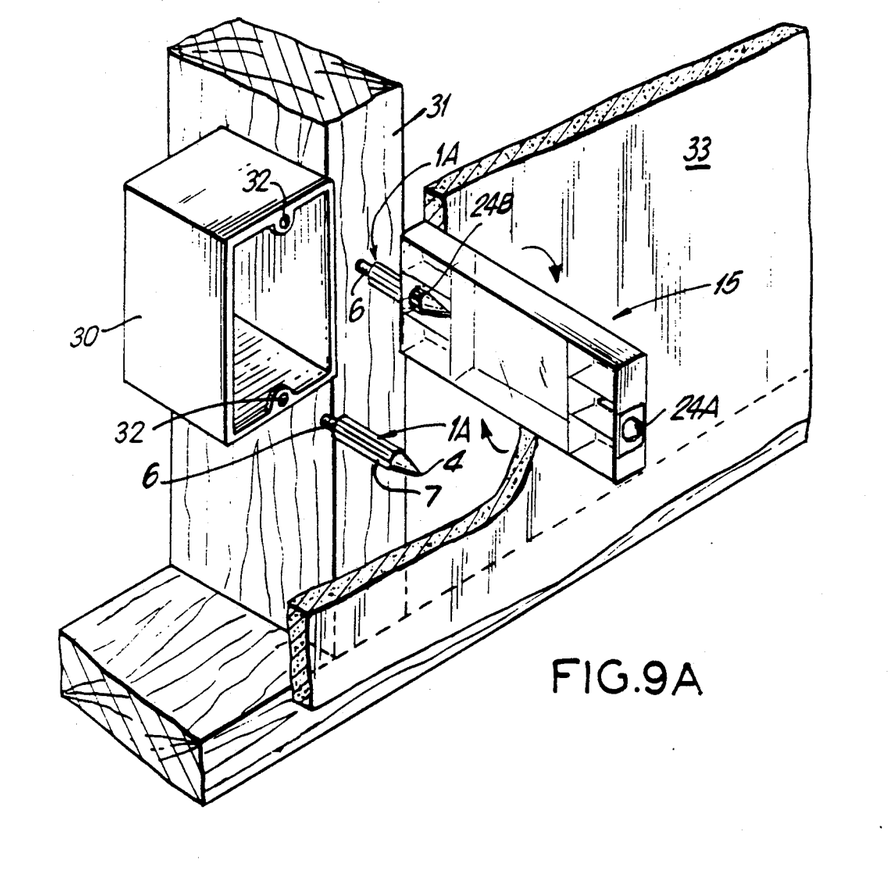
FIG. 9A through 9C are schematic representations illustrating the method of the present invention carried out using the locator element shown in FIGS. 1A, 1B, and 1C and tool shown in FIGS. 7A through 7C.
Figure 9B:
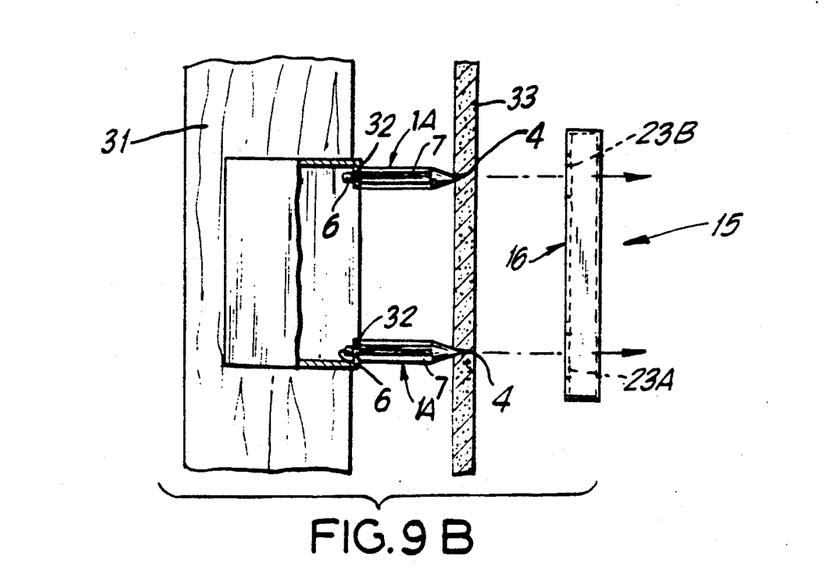
Figure 9C:
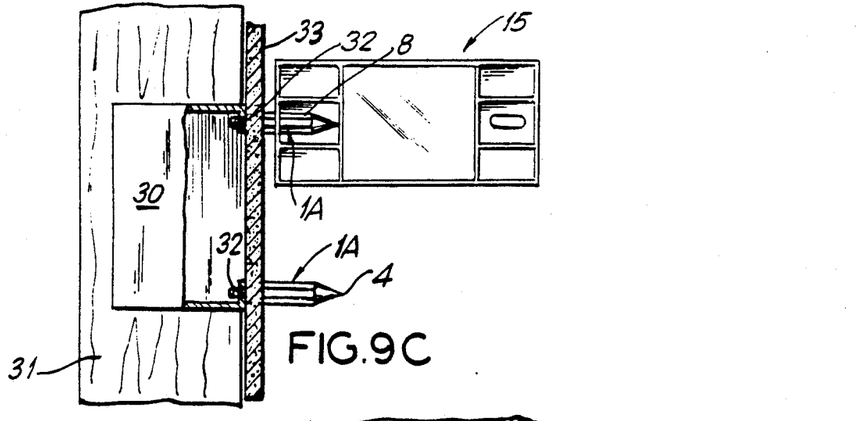

Referring to FIGS. 9A, 9B, and 9C, the method of the present invention will now be described as follows in connection with the locator element 1A illustrated in FIGS. 1A, 1B, and 1C.

As shown in FIG. 9A, utility box 30 attached to the stud 31 of a wall structure is exposed in plain view. Conical puncture means 4 of locator element 1A is placed inside the hexagonally-dimensioned socket 24A, 24B of the locator-element tool of the present invention. In this regard, the shank diameter of each locator element 1A is matched to the internal diameter of sockets 24A, 24B. Using tool 15, the machine-screw structure 6 is turned into the threaded hole 32 of utility box 30 until each locator element 1A is securely attached thereto. Then, construction panel 33, typically sheet-rock, is positioned over the utility box 30 in a predetermined mounting position which will be arrived at using conventional construction techniques. Typically at this stage, construction panel 33 is held into place using several nails or functionally equivalent fasteners.

Thereafter, as illustrated in FIG. 9B, sufficient force is applied to construction panel 33 so that conically-shaped puncture means 4 pierces through construction panel 33 and protrudes therebeyond to expose at least a portion 8 of engaging means 5 for engagement with socket 24A or 24B of the locator-element tool. While construction panel 33 is maintained in place up against and over utility box 30 and wall studs 31 (and others not shown), the exact location of utility box 30 is determined in a conventional manner. Preferably, as illustrated in FIG. 9B, this is performed by placing apertures 23A or 23B of tool 15 over the protruding locator elements 1A, one at a time, so that bottom panel 17 of tool 15 lines up against construction panel 33 and is in general registration with the outer boundaries of utility box 30. This procedure facilitates determination of the general area of the construction panel which is to be removed to form the access opening. In this position, a pencil can be used to mark on the construction panel where the access opening is to be formed.

After drawing the outline of the bottom panel 17 on construction panel 33, locator element tool 15 is removed off of locator elements 1A. Then, as illustrated in FIG. 9C, locator elements 1A are removably detached, one at a time, from utility box 30 by placing gripping socket 24A or 24B over both puncture portion 4 an exposed portion 8 of hexagonally cross-sectioned shank 2, which protrudes beyond construction panel 33. Then by turning handle-holdable tool housing 16, screw structure 6 of locator element 1A turns out of threaded holes 32 in utility box 30. Thereafter, locator element 1A can be easily pulled out of the construction panel altogether.

After completion of the above step, the outlined portion of the construction board can be cut out using a drywall razor, drywall hand saw, jigsaw or other conventional cutting tool, and then removed from the construction panel to thereby form an "access opening" therethrough. By applying a gentle force about the formed access opening, utility outlet box 30 is permitted to the extend slightly therethrough until the face edges of outlet box 30 are either close to or nearly flush with the front surface of the construction panel. Afterwards, construction panel 33 can now be completely nailed or screwed in place in a conventional manner.

Figure 10:
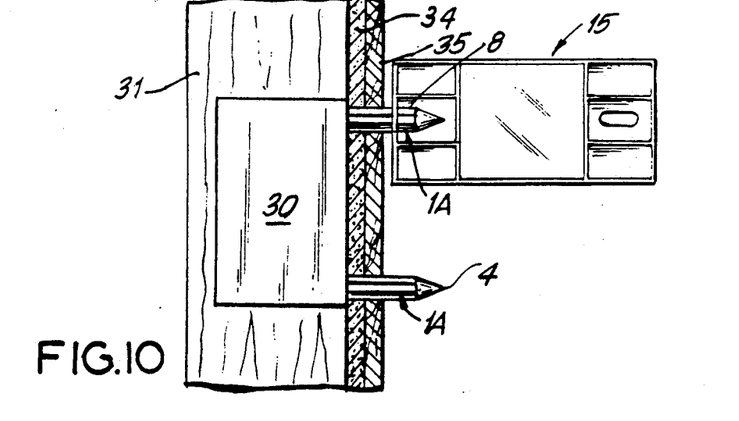
FIG. 10 is a schematic representation illustrating another embodiment of the method of the present invention.

In FIG. 10, another embodiment of the method of the present invention, is illustrated. In this embodiment, an underlying construction panel (i.e. sheet-rock) 34 is positioned over utility box 30, so that locator elements 1A are punctured through the panel in a manner similar to that shown in FIG. 9C. Then an outer finishing panel 35, such as wood paneling for example, is positioned over the underlying construction panel 34 (and thus the utility box 30) so that puncture means 4 pierces through both underlying construction panel 34 and finishing panel 35, exposing a lesser portion 8' of the hexagonally cross-sectioned shank 2. In this manner, socket 24A or 24B of the locator element tool can engage therewith, as hereinbefore described. In this position, outer finishing panel 35 is secured in place using several fastening devices, such as nails or screws. Then after outlining the boundaries of utility box 30 on finishing panel 35, using for example bottom template panel 17 of tool 15, the locator elements 1A are removed from utility box 30, as described hereinabove. Afterwards, the outlined portion of both the outer and underlining construction and finishing panels 34 and 35 are preferably cut out simultaneously using a single cutting tool. In this method, perfectly congruent access openings are formed in both of the construction and finishing panels in a time and labor efficient manner.

While the method and apparatus of the present invention has been described above in connection with locating the position of utility boxes behind construction panels, the present invention can be used to locate other types of utility structures.

Figure 11:
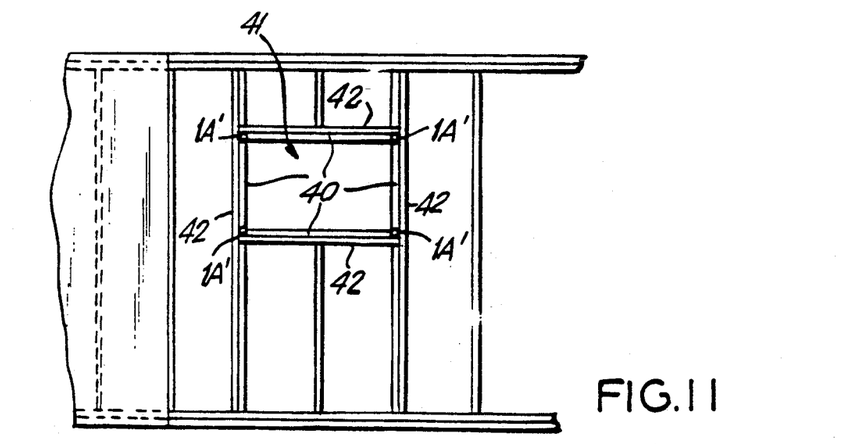
FIG. 11 is a schematic representation of a wall constructed from an assembly of studs arranged to form a conventional window frame, in which an access opening in a construction panel is located using the method and locator element of the present invention.

For example, as illustrated in FIG. 11, the locator elements 1A' shown in FIG. 3 can be screwed into the face portion 40 of a preconstructed window (or door) opening 41 formed by a studded frame 42. Notably, such a window opening 41 would be provided for the installation of a window unit or door (not shown) in a manner well known in the art. Preferably, a plurality of such "self-tapping" locator elements 1A' are screwed into the face portion 40 of the window opening. Typically, the position of these self-tapping locator elements 1A' will be along a locus of points disposed away from the inner perimeter of the frame 42, preferably at a constant preselected distance, e.g. ¾", therefrom. After installing a number of these locator elements 1A' sufficient to define an "access-opening" which corresponds to opening 41 formed by studded frame 42, a construction panel (not shown) is positioned over frame 42, causing puncture means 4 of elements 1A' to pierce through the panel upon application of sufficient pressure, as hereinbefore described. Then, the general locus of protruding locator elements are used to draw the outline or boundary of window opening 41 upon the construction panel. Afterwards, the locator elements are removed, and then the access opening is cut out along the outline drawn upon the construction panel.

While the particular embodiments shown and described above have proven to be useful in many applications in the construction art, further modifications of the present invention herein disclosed will occur to persons skilled in the art to which the present invention pertains, and all such modifications are deemed to be within the scope and spirit of the present invention defined by the appended claims.

What is claimed is:

1. A locator element for locating utility structures disposed behind a construction panel, said locator element comprising:
   a body portion of longitudinal extent having a first end portion and a second end portion;
   screw threads provided to said first end portion for screwing into said utility structure;

puncture means provided to said second end portion for puncturing through said construction panel; and engaging means in the form of knurling on said body portion for engaging with a tool for unscrewing said locator element out of said utility structure while said utility structure is disposed behind said construction panel and with said puncture means punctured through said construction panel.

2. The locator element of claim 1, wherein said engaging means is provided to one or both of said body portion and said puncture means so that when said construction panel is positioned over said utility structure and said puncture means pierces through said construction panel, said engaging means is engagable with said tool for unscrewing said locator element out of said utility structure.

3. The locator element of claim 2, wherein said body portion comprises a cylindrical shank of a length which extends towards said puncture means, and wherein said engaging means comprises at least a portion of said cylindrical shank, the length of said cylindrical shank portion protruding beyond said construction panel when said construction panel is positioned over said utility structure and said puncture means protrudes through said construction panel.

4. The locator element of claim 3, wherein said screw threads of said locator element comprise threads characteristic of a machine screw.

5. The locator element of claim 3, wherein said screw threads of said locator element comprise threads characteristic of a self-tapping wood screw.

6. The locator element of claim 3, wherein said screw threads of said locator element comprise threads characteristics of a self-tapping metal screw.

7. The locator element of claim 2, wherein said utility structure comprises a utility box adapted for mounting to the studs of a wall and having at least one internal set of threads for receiving said screw threads of said locator element, said screw threads of said location element being adapted to be received within said internal set of threads formed within said utility box.

8. A handle-holdable tool adapted for use with a locator element for locating utility structures behind construction panels, said locator element including a body portion having a first end portion and a second end portion, screw threads provided to said first end portion, puncture means provided to said second end portion for puncturing through said construction panel and engaging means for engaging with said hand-holdable tool for screwing said locator element into said utility structure or unscrewing said locator element out of said utility structure, said hand-holdable tool comprising:

a base portion having a base panel including one or more apertures for passage of one or more locator elements so as to facilitate registration of said base portion with said utility structure and determination of the general area of said construction panel which is to be removed; and at least one gripping means provided to said base portion and adapted for releasably gripping said engaging means of said locator element so as to facilitate unscrewing said locator element out from said utility structure while said utility structure is disposed behind said construction panel and with said puncture means punctured through said construction panel.

9. The hand-holdable tool of claim 8, wherein said base portion further includes end wall panels being orthogonally disposed with respect to said base panel, and wherein said gripping means is accessible through at least one of said end wall panels.

10. The hand-holdable tool of claim 9, wherein said outer dimensions of said base panel generally correspond to the outer dimensions of the access opening of an electrical outlet box.

11. The hand-holdable tool of claim 8, said gripping means comprises a socket adapted for releasably gripping said engaging means of said locator element, and wherein said compartment has a central opening and said base portion has a cover panel which can be disposed in an open position to provide access to said central opening, or disposed in a closed position to close off said central opening.

12. The hand-holdable tool of claim 9, wherein said socket has a polygonally shaped cross-section.

13. The hand-holdable tool of claim 9, wherein said socket has a tapered bore.

14. The hand-holdable tool of claim 13, wherein said tapered bore is provided with a textured surface.

15. A hand-holdable tool adapted for use with a locator element for locating utility structures behind construction panels, said locator element including a body portion having a first end portion and a second end portion, attachment means provided to said first end portion, puncture means provided to said second end portion for puncturing through said construction panel and engaging means for engaging with said hand-holdable tool for installing said locator element into said utility structure or detaching said locator element from said utility structure, said hand-holdable tool comprising:

a base portion having a base panel including one or more apertures for passage of one or more locator elements so as to facilitate registration of said base portion with said utility structure and determination of the general area of said construction panel which is to be removed;

at least one gripping means provided to said base portion and adapted for releasably gripping said engaging means of said locator element so as to facilitate detachment of said locator element from said utility structure;

wherein said base portion further includes end wall panels being orthogonally disposed with respect to said base panel, and wherein said gripping means is accessible through at least one of said end wall panels; and wherein said base portion further comprises a compartment for storage of one or more of said locator elements.

16. The hand-holdable tool of claim 15, wherein said compartment has a central opening and said base portion is adapted to receive a slidable cover panel which can be slid into an open position to provide access to said central opening, and slid into a closed position to close off said central opening.

17. The hand-holdable tool of claim 16, wherein said compartment further comprises one or more retaining means for releasably retaining each said locator element within said compartment.

18. The hand-holdable tool of claim 17, wherein said base portion has a longitudinal axis and each said aperture is disposed along said longitudinal axis.

19. The hand-holdable tool of claim 18, wherein said socket is disposed along said longitudinal axis.

20. The hand-holdable tool of claim 18, which further comprises means for attaching releasably attaching said hand-holdable tool to apparel articles selected from the group consisting of a belt and a pocket.

* * * * *